(12) United States Patent
Twardowska et al.

(10) Patent No.: US 11,781,023 B2
(45) Date of Patent: *Oct. 10, 2023

(54) PRIMER WITH INTERNAL GUIDE COAT

(71) Applicant: Illinois Tool Works Inc., Glenview, IL (US)

(72) Inventors: Helena Twardowska, Cincinnati, OH (US); Carlton G. Seaboldt, Cincinnati, OH (US); David J. McKinney, Cincinnati, OH (US)

(73) Assignee: Illinois Tool Works Inc., Glenview, IL (US)

( * ) Notice: Subject to any disclaimer, the term of this patent is extended or adjusted under 35 U.S.C. 154(b) by 669 days.

This patent is subject to a terminal disclaimer.

(21) Appl. No.: 16/747,092

(22) Filed: Jan. 20, 2020

(65) Prior Publication Data

US 2020/0239710 A1    Jul. 30, 2020

Related U.S. Application Data

(60) Provisional application No. 62/798,170, filed on Jan. 29, 2019.

(51) Int. Cl.
*B05D 3/10* (2006.01)
*C09D 5/29* (2006.01)
(Continued)

(52) U.S. Cl.
CPC .......... *C09D 5/29* (2013.01); *B05D 3/00* (2013.01); *B05D 3/04* (2013.01); *B05D 3/0406* (2013.01);
(Continued)

(58) Field of Classification Search
None
See application file for complete search history.

(56) References Cited

U.S. PATENT DOCUMENTS

| 3,382,296 A | 5/1968 | Tenquist et al. |
| 4,370,428 A | 1/1983 | Danville |
| (Continued) | | |

FOREIGN PATENT DOCUMENTS

| JP | S59120612 A | 7/1984 |
| WO | 1995019379 A1 | 2/1995 |
| WO | 2019018392 A1 | 1/2019 |

OTHER PUBLICATIONS

Int'l. Search Report for PCT/US2020/014372, dated May 20, 2020.
Supplementary European Search Report issued in EP20749724, dated Sep. 22, 2022.

*Primary Examiner* — Shamim Ahmed
*Assistant Examiner* — Bradford M Gates
(74) *Attorney, Agent, or Firm* — MaxGoLaw PLLC (57) ABSTRACT

A free radical curable automotive body primer is provided that has a color change corresponding to the progress of the cure process until a dry to sand condition has been attained and an internal colored guide coat that does not change color given its exposure to ambient air and as a result, has a different color on the surface of the primer than when in bulk, allowing for the detection and removal of low spots or other imperfections from a vehicle body by additional sanding of the inventive primer to remove oxidized guide coat colorant surface regions. The cure color change is achieved through resort to at least one color changing dye that reacts with a free radical cure initiator during the vehicle body priming process and changes color to indicate when the primer composition has achieved a level of cure so as to be dry enough to sand.

6 Claims, 11 Drawing Sheets
(11 of 11 Drawing Sheet(s) Filed in Color)

(51) Int. Cl.
  *C09D 5/00*    (2006.01)
  *C09D 133/04*  (2006.01)
  *C09D 167/06*  (2006.01)
  *C09D 4/06*    (2006.01)
  *B05D 3/06*    (2006.01)
  *B05D 3/00*    (2006.01)
  *B05D 3/04*    (2006.01)

(52) U.S. Cl.
  CPC ............ *B05D 3/06* (2013.01); *B05D 3/107* (2013.01); *B05D 3/108* (2013.01); *C09D 4/06* (2013.01); *C09D 5/002* (2013.01); *C09D 133/04* (2013.01); *C09D 167/06* (2013.01); *B05D 2508/00* (2013.01)

(56) References Cited

U.S. PATENT DOCUMENTS

| | | | |
|---|---|---|---|
| 4,522,963 | A | 6/1985 | Kecskemethy et al. |
| 6,518,356 | B1* | 2/2003 | Friese .................. C08K 5/0041 |
| | | | 523/303 |
| 2005/0227162 | A1* | 10/2005 | Van Rooyen ........ C09D 175/04 |
| | | | 252/500 |
| 2013/0004663 | A1 | 1/2013 | Adams et al. |
| 2016/0319105 | A1* | 11/2016 | Schulz .................. C09B 69/008 |
| 2018/0118903 | A1 | 5/2018 | Zaffaroni et al. |
| 2019/0023931 | A1 | 1/2019 | Twardowska et al. |

* cited by examiner

PRIMER WITH INTERNAL GUIDE COAT

RELATED APPLICATIONS

This application claims priority benefit of U.S. Provisional Application Ser. No. 62/798,170 filed Jan. 29, 2019, the contents of which are hereby incorporated by reference.

FIELD OF THE INVENTION

The present invention in general relates to a primer composition and in particular, to such a composition that changes color when cured except for at the surface, which provides a guide coat to show surface defects.

BACKGROUND OF THE INVENTION

Manufacturers and consumers alike demand vehicle body parts having high quality surface finishes on both new vehicles and body repairs after damage. Typically, such high-quality surfaces are referred to as a "high gloss surface," that is a surface having minimal perceptible surface defects when visually inspected for about three seconds from about 24-28 inches from the viewer and normal to the part surface +/−90 degrees in a well-lit area. Such "high gloss surfaces" are capable of being painted and accepted as a "Class A" autobody part. This is commonly measured by ASTM D523. In the automotive industry, a Class A surface is a surface a consumer can see without functioning the vehicle (e.g., opening the hood or decklid). Furthermore, a Class A surface finish generally refers to painted outer panels and specifically to the distinctness of image (DOI) and gloss level on the part.

In the case of both new vehicles and vehicle body repairs, to achieve these high-quality surface finishes, such a surface layer is subjected to filling, sanding, trimming, and priming prior to receiving a paint coating that imparts high gloss. Obtaining a smooth surface free of surface defects is important prior to painting, given that any surface defects present on the vehicle body surface tend to be amplified and are very visible once the high gloss paint is applied. Therefore, great care is taken to ensure each layer applied to a vehicle body surface is smooth and free of defects prior to painting. Detecting low spots or other imperfections on a vehicle body during each of these preparation steps, including the priming process, is a time-consuming and labor-intensive process. The priming process is an important step in achieving a high-quality surface finish in that the primer wets the surface of the substrate to which it is applied to adhere thereto, providing a surface prepared for painting.

Conventional techniques to control the smoothness of vehicle body surface after priming generally require a separate step which involves the application of a separate commercial guide coat product on the vehicle body surface. This separately added commercial guide coat reveals the presence of any low spots or other imperfections, indicating that further sanding is necessary to remove these low spots or other imperfections. Unfortunately, this added step requiring separate application of commercial guide coat is typically a messy process and results in a less efficient repair process and a longer repair time.

Thus, there exists a need for a primer composition that is capable of providing a colorimetric change when the applied primer coating is cured and amenable to sanding while also providing a guide coat capable of indicating surface defect and low spots in the applied primer coating to guide sanding efforts to achieve a smooth primed surface ready for the application of paint.

SUMMARY OF THE INVENTION

A process for priming a vehicle body includes mixing a polyester resin formulation part A that includes a curable resin having a degree of unsaturation, a monomer reactive diluent in which the curable resin is dissolved or suspended, and at least one color changing dye adapted to change color upon mixing of the part A and the part B, a terminal color change occurring within ±5 minutes of cure of the curable resin and adapted to react with ambient air or light or a combination thereof to form a guide coat; with a part B storage-separate free-radical cure initiator package having a free-radical cure initiator to form a mixture. The mixture is applied to a substrate of the vehicle body in need of priming, and the mixture is cured on the substrate under conditions adapted to cause the at least one color changing dye within to change to the terminal color within ±5 minutes of cure of the curable resin to a cured condition suitable for overcoating and to cause the at least one color changing dye at an exposed surface of the applied mixture to react with ambient air or light or a combination thereof to form the terminal color of the guide coat and having an internal color based on a lack of oxygen that is different from the terminal color.

A vehicle primer formulation is provided that includes a part A having a curable resin with a degree of unsaturation, and a monomer reactive diluent in which the curable resin is dissolved or suspended, and a part B storage-separate, free-radical cure initiator package that includes a free-radical cure initiator, and at least one color changing dye adapted to change color upon mixing of said part A and said part B. A terminal color change occurs within ±5 minutes of cure of the curable resin to a sandable condition and adapted to react on surface with ambient air or light or a combination thereof to form a guide coat with a terminal color wherein oxygen inhibition reduces a rate of reaction of the at least one color changing dye with free radicals responsible for the terminal color.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein:

FIG. 2I is a photograph of a control sample for the testing of samples shown in FIGS. 2A-2H, wherein the top half of the sample shows the control coating after spraying application and the bottom half of the sample shows the control coating after partial sanding;

DETAILED DESCRIPTION OF THE PREFERRED EMBODIMENTS

The present invention has utility as a free radical curable automotive body primer that has a color change corresponding to the progress of the cure process until a dry to sand condition has been attained and an internal colored guide coat that does not change color given its exposure to ambient air and as a result, has a different color on the surface of the primer than when in bulk, allowing for the detection and removal of low spots or other imperfections from a vehicle body by additional sanding of the inventive primer to remove oxidized guide coat colorant surface regions. The present invention also has utility as a process for priming a vehicle body.

The cure color change is achieved through resort to at least one color changing dye that reacts with a free radical cure initiator during the vehicle body priming process and changes color to indicate when the primer composition has achieved a level of cure so as to be dry enough to sand. The at least one color changing dye is added to a primer formulation during production. The formulation remains storage stable until mixed with a free radical generating peroxide. The free radicals initiate a crosslinking reaction of curable resin. Dye molecules also react with free radicals and change color during that process, for instance going from red to colorless. The cure color change correlates with completion of a crosslinking reaction and indicates the time when the cured primer is ready for sanding. Dyes that are particularly useful to indicate dry to sand time exhibit one color in an oxidized state and exhibit a different color when in a reduced state. Furthermore, dyes that are particularly useful to indicate dry to sand time are those that have a reactivity with free radicals similar to reactivity of resin, typically an unsaturated polyester vinyl ester mixture. According to embodiments, the inventive primer includes a reactive dye that contains an azo group. For instance, FR-1 dye has an initially red color and after reaction becomes colorless as a result of disruption of pi bonding system being an essential part of chromophore.

The inventive primer also acts as an internal, in-situ forming guide coat. By selecting and including a dye in the primer that reacts to ambient air or is inhibited by exposure of oxygen, the dye at the surface of the applied primer has a different color than the cured primer in the bulk. Without intending to be bound by a particular theory, the color change of the selected dye is slowed as the selected dye reacts to oxygen or moisture or room light to change color, the surface reacted color is described herein synonymously as an oxidized color. By selecting a dye that experiences a slower color change due to oxygen inhibition or reaction with substances found at the surface of the applied primer, reaction of the dye with radicals is faster in bulk than on the surface, and therefore there is a residual dye color left on the surface which creates a guide coat. The guide coat is a very thin layer compared to the coating thickness and follows the morphology of surface to which the guide coat is applied. The guide coat shows the roughness of the coated surface and all surface defects, such as high and low spots on the coating, which is known in the industry as "orange peel." The guide coat acts as a helpful visual guide for users when sanding the primer coating, typically with a very fine sand paper (P220 grit fineness), to produce a very smooth surface finish. During the sanding process, low spots or other imperfections remain after an initial sanding that removes the oxidized guide coat colorant from the majority of surface, so as to make low spots visually identifiable as regions in which sanding has not removed the surface oxidized guide coat colorant. This allows a technician to continue the sanding process until complete removal of the color associated with the oxidized guide coat colorant is achieved, further allowing the technician to visually confirm that no low spots or other imperfections remain on the repair. Because of the guide coat, a user is able to know that the sanding is complete when the coating surface does not show any residual dye color and is instead the same uniform color as the cured bulk primer, for example gray. Ensuring the smoothness of the primer coating is very important as it determines the quality of final coating.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The present invention includes the modification of a free radical curable vinyl group resin formulation to include at least one dye that changes color to mark the progression of cure of the bulk of a coating and that reacts slower with ambient conditions present at the surface of the coating to provide a colored guide coat to assist with sanding the coating to a smooth surface. Substrates to which an inventive formulation are applied illustratively include mild steel, stainless steel, zinc/zinc-aluminum-coated steel, copper, bronze, silicon bronze, tin, aluminum, solder, brass, thermoplastics, and sheet molding compositions. It is appreciated that the present invention is particularly well-suited for the autobody repair industry. The inventive primer formulation strongly adheres to the underlying substrate to which it is applied. Once cured and sanded, the primer provides a surface prepared for and compatible with paint.

An inventive primer formulation in certain embodiments illustratively include free radical curable formulations vinyl groups, urethanes, acrylics, vinyl esters, unsaturated polyester, and combinations thereof. According to embodiments, the free radical curable primer is modified with specialized additives to control the free-radical polymerization so as to minimize cure reaction exothermocity and shrinkage.

As used herein, "sandable" with reference of a cured inventive formulation is defined as having limited clogging of sandpaper and able to form featheredge.

As used herein, "terminal color change" is when an evolving color or dissipation of a color has no discernable difference in color to an unaided human eye over ten minutes under constant ambient lighting conditions.

An inventive primer resin has a degree of ethylenic unsaturation that is between 20 and 100% of the non-alcoholic monomer in a polyester resin and denotes reactivity within the polyester resin backbone to free radical polymerization. The unsaturation in a polyester backbone is reactive with vinyl and allyl moieties of a styrenic or non-styrenic molecule through free-radical polymerization.

In some embodiments, an inventive primer is terminally functionalized with molecules illustratively including allyl glycidyl ether, glycidyl methacrylate, trimethylolpropane diallyl ether, allyl pentaerythritol or polymeric allyl glycidyl ether.

An inventive primer is readily formed in a single reaction or in multi-stage reactions. Typical reaction temperatures range from 130-240° C. A conventional esterification catalyst is present and illustratively includes acids, transition metal catalysts, and organo-tin compounds. Typical catalyst loadings range from 0.01 to 1 total weight percent of the reactants.

Reactive vinyl group resins used in an inventive primer formulation have a weight average molecular average weight ranging from 5,000 to 600,000. For purposes of calculating monomer percent, reactive diluents are omitted. Polyester resin based formulations operative herein are detailed in Table 1.

To form a primer formulation, the resulting reactive polyester resin is dissolved in a reactive diluent. Reactive diluents operative herein include acrylics, acrylates, and methacrylates such as methyl methacrylate, butyl acrylate, ethyl-hexyl acrylate, hydroxpropyl methacrylate, hydroxethyl methacrylate, lauryl acrylate, stearyl methacrylate, lauryl methacrylate, butanediol diacrylate, ethyleneglycol dimethacrylate, ethyleneglycol-DCPD methacrylate, ethyl (meth)acrylate and n- and isobutyl(meth)acrylate, cyclohexyl(meth)acrylate, isobornyl(meth)acrylate, benzyl(meth) acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure $(C_1$-$C_6$ alkyl)-O—$(C_2$-$C_6$ alkylene) such as ethyl vinyl ether, or methyl vinyl; styrene, α-methylstyrene, vinyl toluene, di-functional styrene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

Additives are present in an inventive formulation to improve at least one property of handling, storage, cure rate, sandability, or substrate adhesion. The additives illustratively include at least one of a thixotropic agent, a pigment, a dye, a suppressant, a filler, an adhesion promoter, an inhibitor, a leveling agent, or a wetting agent.

A thixotropic agent operative in the present invention illustratively includes fumed silica, organoclays, inorganic clays and precipitated silica. Multifunctional alcohols are commonly used to enhance thixotropic properties. A thixotropic agent is present from 0 to 10 percent by weight. The thixotropic agent is typically present from 0.1 to 2 total weight percent of a complete formulation for application to a substrate.

A fast pigment or dye operative in the present invention illustratively includes titanium dioxide, carbon black, iron oxides, and phthalocyanine blue. These fast pigments and dyes are amenable to dissolution or suspension in the reactive diluent and do not change color during the course of free radical polymerization. A pigment or dye is present from 0 to 10 total weight percent of a complete formulation for application to a substrate. In some inventive embodiments, an unreactive pigment or dye, synonymously referred to herein as a fast pigment or dye is added to the part B to visually show a user when parts A and B have been uniformly mixed. In the following inventive examples, methyl ethyl ketone peroxide (MEKP) or benzoyl peroxide (BPO) are used to cure primers based on unsaturated polyester/vinyl ester mixtures.

A suppressant reduces vapor emissions and in some embodiments, enhances surface cure time. A suppressant operative in the present invention illustratively includes waxes, polyethers, polysiloxanes and various block copolymers. A suppressant is present from 0 to 5 total weight percent of a complete formulation for application to a substrate.

Filler particulates or fibers operative in the present invention illustratively include talc, alumina trihydrate, calcium sulfate, calcium carbonate, magnesium sulfate, magnesium carbonate, barium sulfate, and the like. A filler is present from 0 to 60 total weight percent of a complete formulation for application to a substrate. It is appreciated that a pigment and filler can have the same function and in those instances where both are present in a formulation, the amounts of both are cumulative.

A leveling agent operative in the present invention illustratively includes acrylic resins, fluorocarbons, fluoropolymers and silicones. A leveling agent is present from 0 to 2 total weight percent of a complete formulation for application to a substrate.

A wetting agent operative in the present invention illustratively includes boric acid esters, phosphate esters, fatty acid salts, and polyethers. A wetting agent is present from 0 to 2 total weight percent of a complete formulation for application to a substrate.

An adhesion promoter operative in the present invention illustratively includes silanes, tetrahydrophthalic anhydride. An adhesion promoter is present from 0 to 2 total weight percent of a complete formulation for application to a substrate.

An inhibitor is present to extend shelf storage ability and extend cure time. Cure inhibitors operative herein illustratively include hydroquinone, parabenzoquinone, toluhydroquinone, 4-tert butylcatechol, and metal naphthenates. A cure inhibitor is present from 0.0005 to 1 total weight percent of a complete formulation for application to a substrate.

A resin formulation is typically stored as a part A that includes all components with the exception of a curative package, and a part B containing a curative package that is mixed with the part A immediately before application to the vehicle body substrate. In some inventive embodiments, a resin formulation is stored as a part A that includes all components with the exception of a curative package and a package containing at least one color changing dye. A part B containing a curative package, and a part C containing at least one color changing dye are mixed with part A immediately before application to the vehicle body substrate. It is appreciated that other components with the exception of the vinyl group resin are also present in the curative package.

The resin compositions of the present invention are cured to react with the reactive diluent by a number of free-radical cure initiators that include organic peroxide, azo-type initiators, electron beam, ultraviolet (UV) light, and combinations thereof. Peroxide initiators operative herein illustratively include diacylperoxides, hydroperoxides, ketone peroxides, peroxyesters, peroxyketals, dialkyl peroxides, alkyl peresters and percarbonates. Azo-type initiators operative herein illustratively include azobisisobutyronitrile (AIBN). Benzoyl peroxide (BPO) is a prototypical free-radical cure initiator. Chemical cure initiators are typically present from 1 to 5 total weight percent of a fully mixed and applied polyester resin formulation. These resin compositions may optionally be cured by UV or electron beam.

At dry to sand ("DTS"), the resulting primer has sufficient bond strength to the substrate to render a "featheredge," meaning a smooth and gradual transition from primed areas to the edges primed areas, and no tearing or chipping at a perimeter edge of the primer on the substrate. To facilitate detection of this stage of cure, at least one dye is added that has a color change occurring at a time that corresponds to the DTS condition of the resin formulation cure.

It is appreciated that because the cure of a given resin formulation varies as a function of variables that illustratively include primer coating thickness, ambient air temperature, and cure temperature, the dye specifics as to amount and identity will have to be adjusted to coincide with the DTS condition as a function of variables such as those included in the non-exhaustive list above. Color change dyes operative herein have the attribute of a conjugated ring system having two separate aryl domains with an intermediate unsaturated bond there between of the general formula A-X-A', where A and A' are each independently an aryl moiety $C_6H_5-$, $C_{10}H_7-$, $C_5NH_4-$, $C_4NH_4-$, $C_4N_2H_3-$ and substituted forms thereof in which any given hydrogen is substituted by a $C_1$-$C_4$ alkyl, $C_1$-$C_4$ alkyl primary amine, $C_0$-$C_4$ alkyl phenyl, $C_0$-$C_4$ alkyl hydroxyl, $C_1$-$C_4$ alkyl ester, $C_0$-$C_4$ alkyl sulfonates, or a combination thereof, where X is N=N, C=C, C(O), C(N—H). Without intending to be bound to a particular theory, the unsaturated central double bond is reactive with free radicals of the resin curative package and is kinetically competitive with unsaturations in the resin and monomer, such that the unsaturated central double bond reacts during cure thereby disrupting the conjugation between groups A and A', resulting in the color created by the conjugation between A and A' disappearing as cure progresses. It is appreciated that A and A' may separately have a color visible, yet so long as the color of A and A' without a pi-bonding conjugation is different than that of A-X-A', then a suitable dye exists for the present invention. According to the present invention azo dyes are particularly suitable owing to the brilliant color of the dyes and variety of commercially available colors. With a —N=N— as the X in an inventive color changing dye, sampling various aryl groups for steric constraint of free radical reaction is a survey exercise. Specific dyes operative in the present invention include: red (FR-1 of United Initiators), those detailed in US2006/0202158, or US2016/041143; blue— (Oil Blue A of Greenville Colorants L.L.C.); and yellow/orange: dimethylamino-azobenzene (DAB), methylamino-azobenzene (MAB) aminoazobenzene (AAB), 4-hydroxyazobenzene, dimethylamino-azopyridine, and substituted forms thereof in which any given aryl-hydrogen is substituted by a $C_1$-$C_4$ alkyl, $C_1$-$C_4$ alkyl primary amine, $C_0$-$C_4$ alkyl phenyl, $C_0$-$C_4$ alkyl hydroxyl, $C_1$-$C_4$ alkyl ester, $C_0$-$C_4$ alkyl sulfonates, or a combination thereof. It is appreciated the carboxy-DABs, such as 2'- or 4'-carboxy-DABs, and the methyl esters thereof are red in color.

Overcoming the unique issues related to the above-mentioned wide-ranging repair conditions using color changing dyes that react with radicals during the car repair process and change color to indicate dry to sand time of the primer while also providing a built-in guide coat indicative of surface imperfections is the basis for present invention. The ability to visually confirm achievement of DTS time via color change and the ability to identify surface imperfections in the applied and cured primer reduces technician subjectivity, increases efficiency and quality while simultaneously decreasing both priming and sanding time and cost. This use environment has proven particularly challenging owing the lack of control over cure environment and repair conditions and the demands for high throughput. The at least one color changing dye is added to primer during production. The composition remains stable until mixed with the free-radical cure initiator when radicals are formed. The radicals initiate crosslinking reaction of resin (vinyl group) with monomer, typically styrene, resulting in hardened primer on the repair area. Molecules of at least one color changing dye also react with radicals and change color during the resin cure process, for instance going from red to colorless. According to some inventive embodiments, a color changing dye is present from 0.3 to 2.0 total weight percent, with only 2 to 3 weight percent of the dye being the active ingredient in N-methyl-2-pyrrolidone solution. According to embodiments, a color changing dye is present from 0.005 to 0.05 total weight percent of the active dye in a complete formulation for application to a substrate with the specific amounts being informed by the following examples that illustrate the rate of color change as a function of temperature and the amount of free-radical cure initiator. It is appreciated that this dye amount is typically added as a dilute solution as detailed in Table 1.

In embodiments of the inventive primer, the color changing dye is present in a specific amount being informed by the following examples that illustrate the rate of color changes as a function of temperature and the amount of free-radical cure initiator with molecules of the dye at the surface of the primer coating reacting with the ambient environment to create a guide coat. It is appreciated that the inclusion of at least two color changing dyes into the inventive formulation allows for increased flexibility in matching the reactivity of the color changing dyes with free radicals that correlates with DTS time of the primer under various repair conditions. However, according to embodiments, a single dye present in the inventive primer is able to provide indication of a DTS time and a guide coat indicating imperfections in the surface of the primer. Through titration of the relative amount of the color changing dye in the inventive formulation, matching the reactivity of the color changing dye with free radicals that correlates with the DTS time of the repair under various repair conditions is made easier. It is appreciated that the amount of free radical initiator can also be controlled to match the reactivity of the color changing dye with free radicals that correlates with the DTS time of the repair under various conditions.

Color change of the dye occurs in some inventive embodiments with resort to an unaided, normal human eye. While the color changes of the color changing dye are readily detectable with a laboratory ultraviolet-visible (UV-VIS) spectrum spectrophotometer, this equipment is uncommon in a vehicle repair shop. However, a color change associated with cure is readily detected by collecting a digital color photograph that can be analyzed by software based on the known spectra of the fill in uncured and fully cured states containing a given color changing dye package, even if not discernable by an unaided normal human eye. The analysis software operating on a remote computer accessed via the Internet or an intranet, or a device such as a tablet or smart phone used to collect the digital photograph. It is appreciated that such software can predict cure time based on analysis of two or more photographs of the same fill that vary as a function of time.

As described above, the dye present in the inventive primer also forms a guide coat as the primer cures. The guide coat, which forms on the surface of the applied primer, helps a user or technician detect low spots or other imperfections on the primed site. Dyes that are particularly useful for forming an inventive guide coat on the primer surface form a different color than the color of the cured primer, are slow to change color, or fail to change color on the surface of the applied primer formulation. According to embodiments, the guide coat is formed by oxygen inhibition or another form of inhibition of the dye molecules when exposed to ambient conditions. Therefore, the dye molecules on the surface of the primer react with oxygen from air, moisture from air, or light exposure and are inhibited from changing color, while the dye molecules internal to the primer coat and protected from the ambient color change inhibiting conditions. According to embodiments, the guide coat colorant is the same as the cure reactive dye described above. Owing to reactivity with air or room light found in a repair setting, the dye molecules at the coating surface either change color or fail to change color such that the surface of the coating, which has been exposed to ambient conditions, is a different color than the cure primer that has not been exposed to the color change inhibiting ambient environment.

With reference to the following examples in which Red Dye FR-1, methylene blue, and/or Oil Blue A dye are utilized for this purpose, the guide coat is either red/pink or blue/green on the oxidized surface of the primed surface while the bulk color of the cured primer is significantly lighter, being a light gray color. It is appreciated that speed of the color changing reaction is important in order to develop a guide coat during cure of the inventive formulation and should be on the order of the DTS time. It is further appreciated that good contrast between surface and bulk colors aid in detection of low spots or other imperfections on the primed site. During sanding of the primed site, the color of the bulk of the cured primer is uncovered and low spots which still have the guide coat surface color become apparent. Existence of surface color indicates the need for continued sanding of the primed site. Confirmation that no low spots remain on the vehicle body is achieved by sanding the repair site until no more guide coat surface color is detectable by the unaided, normal human eye. It is appreciated that inclusion of an internal guide coat into the inventive formulation dispenses with the need for an additional step requiring application of a separate commercial guide coat onto the primed site, thereby shortening repair time, improving efficiency, and reducing the cost of the repair process.

Cure reactive color change dye provides a more accurate method to determine time to start sanding, resulting in better quality of a primed surface, especially at the featheredge, where the applied primer thins to create a common surface plane with the surface and practically allows multiple priming to be performed in parallel by watching color changes of each repair. Also, it provides visual indication of potential problem with the primer, for instance if the amount of catalyst is too small the color change will not be complete, indicating an incomplete cure and the need to revisit the primed surface.

It is appreciated that both features of this invention—the internal guide coat and color change to indicate DTS time—are totally independent and may be used separately or combined for maximum benefit.

The present invention is further described with respect to the following non-limiting examples. These examples are intended to illustrate specific formulations according to the present invention and should not be construed as a limitation as to the scope of the present invention.

Example 1—Compounding of First Inventive Formulation

TABLE 1

| Composition of Vehicle Primers Containing Cure Reactive Dye-Part A | |
|---|---|
| Chemical | Weight % |
| UPR Resin 20-60% unsaturation | 7-35 |
| Vinyl Ester Resin | 7-35 |
| Reactive diluent | 3-10 |
| Cure Reactive Dye: FR-1 2.5% solution | 0.2-1.5 |
| Rheological: organoclay | 0.1-0.5 |
| Wetting agent: alkylammonium salt of an acidic copolymer | 0-2 |
| Promoter: tertiary amine | 0.03-0.5 |

TABLE 1-continued

Composition of Vehicle Primers
Containing Cure Reactive Dye-Part A

| Chemical | Weight % |
| --- | --- |
| Promoter: Co naphthenate 12% | 0.1-0.5 |
| Promoter: Cu octoate 8% | 0.01-0.5 |
| Pigment paste | 0.1-1 |
| Inhibitor: reacted benzoquinone | 0.01-0.5 |
| Styrene suppressant: wax mixture | 0.2-0.5 |
| Solvent: Acetone | 10-20 |
| Fillers/pigments | Remainder such as: |
| Pigment: $TiO_2$ | 0-6.0 |
| Calcium carbonate: 0.5-15 micron | 0-40.0 |
| Talc 1: 0.5-10.0 micron | 0-10.0 |
| Talc 2: 10-20 micron | 0-40.0 |

80 ppm of red reactive dye is admixed into the part A, resulting in first color. Part B is added to Part A in the amount to deliver 1-3 total weight percent MEKP based on total Part A and mixed. The mixture is sprayed on a substrate and allowed to cure either at room temperature (air drying) or baked at 130-145 F to accelerate the cure. The initial color of primer layer is inside and on surface is red/purple. As cure progresses, the color inside primer layer fades to light gray but color on the surface remains red/purple, creating a guide coat.

Figures 1A, 1B, 1C:
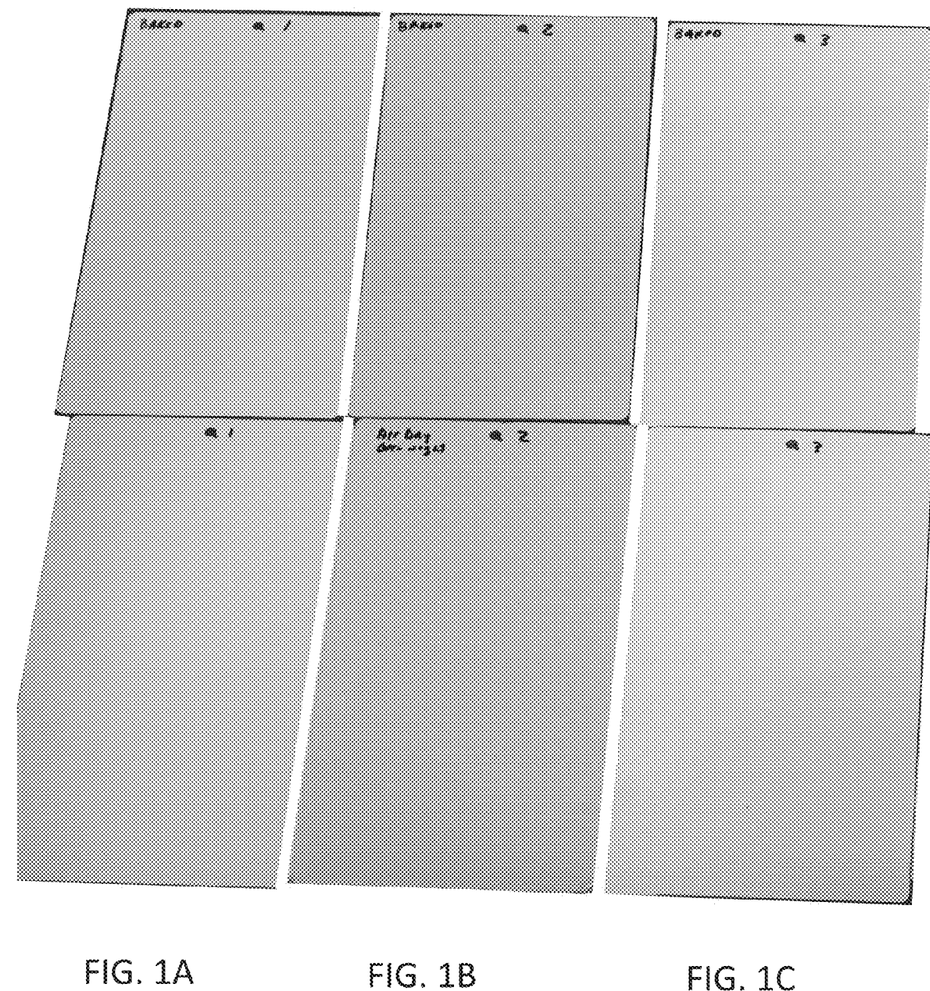
FIGS. 1A-1C are photographs of samples coated with a vinyl ester/unsaturated polyester and Red Dye FR-1 primer according to various embodiments of the present disclosure, wherein the primer on the samples of FIG. 1A includes 0.3% Red Dye FR-1, the primer on the samples of FIG. 1B includes 0.5% Red Dye FR-1, and the primer on the samples of FIG. 1C includes 0% Red Dye FR-1.

Example 2—Compounding of Inventive Formulations with Different Amounts of Red Dye The process and general formulation of Example 1 is repeated with Vinyl Ester/Unsaturated Polyester resin and varying amounts of Red dye FR-1. Samples are prepared as shown in FIGS. 1A-1C. The primer formulation on the samples of FIG. 1A includes 0.3% Red Dye FR-1, the primer formulation on the samples of FIG. 1B includes 0.5% Red Dye FR-1, and the primer formulation on the samples of FIG. 1C includes 0% Red Dye FR-1. The samples shown at the top of each of FIGS. 1A-1C coated in these inventive formulations were baked at 145 degrees F. for 45 minutes, while the samples shown at the bottom of each of FIGS. 1A-1C coated in these inventive formulations were cured at room temperature.

Example 3—Compounding of Inventive Formulations with Different Resins

The process and general formulation of Example 1 is repeated with Red dye FR-1 present in an amount of 0.5 weight % and different types of resin. Different resins have different composition and require different curatives.

Figure 2A:
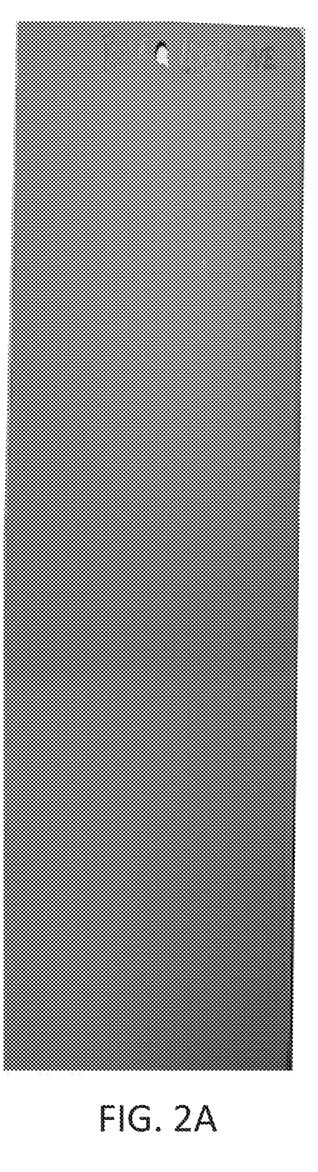
FIGS. 2A and 2B are photographs of samples coated in a Red Dye FR-1 at 0.5% and urethane primer, with the sample of FIG. 2A being baked and the sample of FIG. 2B being air dried, wherein the top half of the samples show the primer after spraying application and the bottom half of the samples show the primer after partial sanding.
Figure 2B:
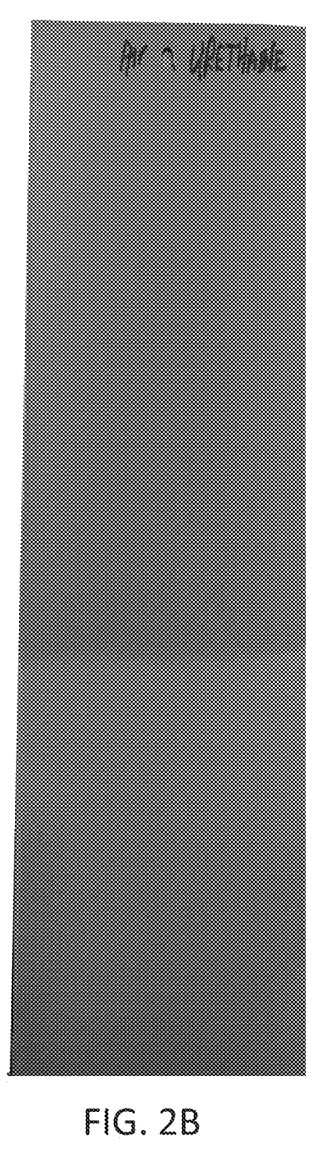

FIGS. 2A and 2B are photographs of samples coated in a Red Dye FR-1 at 0.5% and urethane primer, with the sample of FIG. 2A being baked and the sample of FIG. 2B being air dried.

Figure 2C:
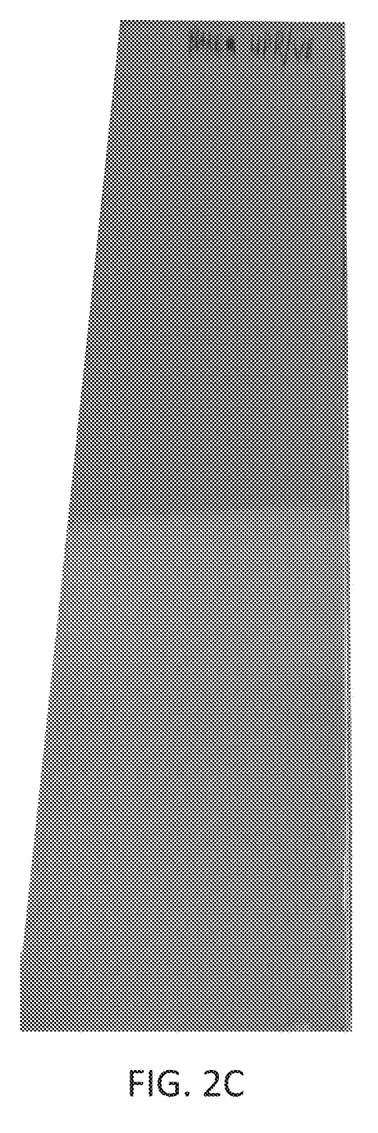
FIGS. 2C and 2D are photographs of samples coated in a Red Dye FR-1 at 0.5% and UPR/VE (Slick Sand) primer, with the sample of FIG. 2C being baked and the sample of FIG. 2D being air dried, wherein the top half of the samples show the primer after spraying application and the bottom half of the samples show the primer after partial sanding.
Figure 2D:
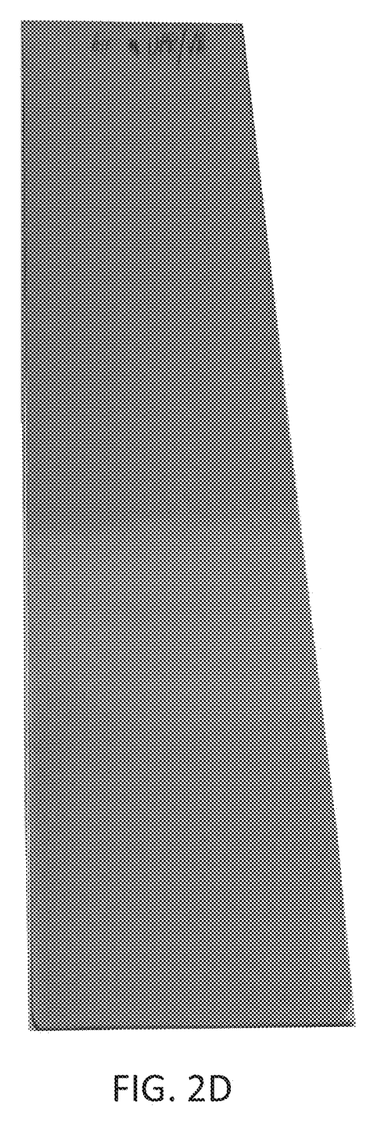

FIGS. 2C and 2D are photographs of samples coated in a Red Dye FR-1 at 0.5% and UPR/VE (Slick Sand) primer, with the sample of FIG. 2C being baked and the sample of FIG. 2D being air dried.

Figure 2E:
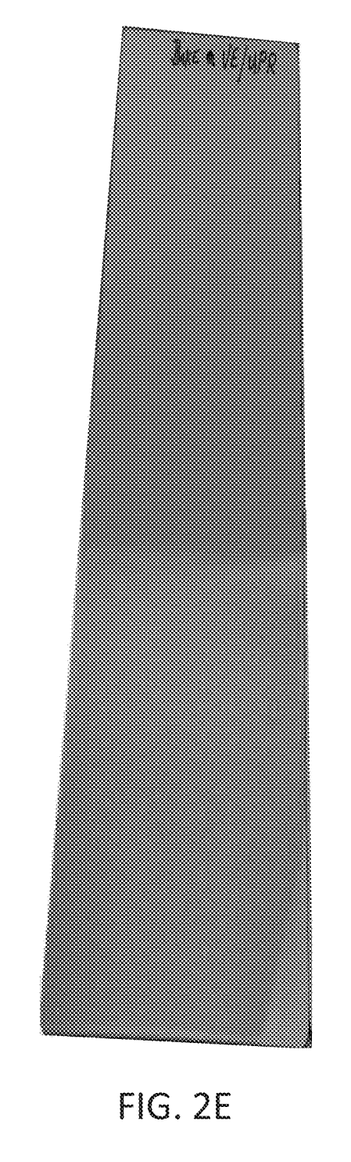
FIGS. 2E and 2F are photographs of samples coated in a Red Dye FR-1 at 0.5% and VE/UPR (Super Build) primer of FIG. 1B, with the sample of FIG. 2E being baked and the sample of FIG. 2F being air dried, wherein the top half of the samples show the primer after spraying application and the bottom half of the samples show the primer after partial sanding.
Figure 2F:
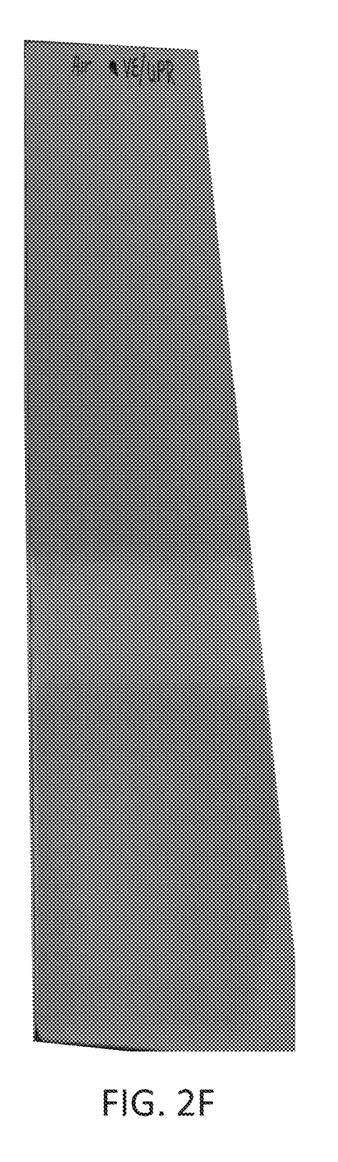

FIGS. 2E and 2F are photographs of samples coated in a Red Dye FR-1 at 0.5% and VE/UPR (Super Build) primer of FIG. 1B, with the sample of FIG. 2E being baked and the sample of FIG. 2F being air dried.

Figure 2G:
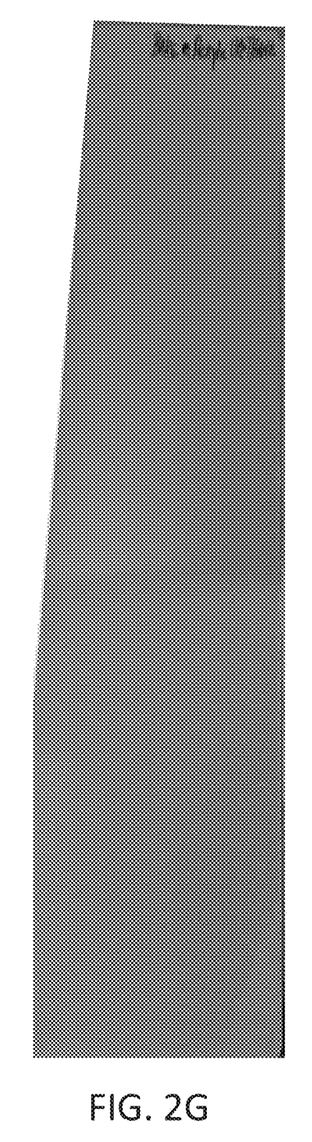
FIGS. 2G and 2H are photographs of samples coated in a Red Dye FR-1 at 0.5% and Acrylic Urethane primer, with the sample of FIG. 2G being baked and the sample of FIG. 2H being air dried, wherein the top half of the samples show the primer after spraying application and the bottom half of the samples show the primer after partial sanding.
Figure 2H:
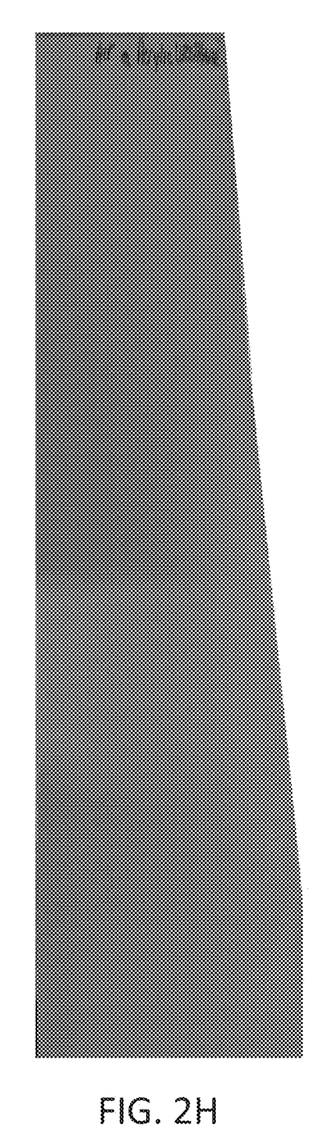

FIGS. 2G and 2H are photographs of samples coated in a Red Dye FR-1 at 0.5% and Acrylic Urethane primer, with the sample of FIG. 2G being baked and the sample of FIG. 2H being air dried.

FIG. 2I is a photograph of a control sample without red dye for the testing of samples shown in FIGS. 2A-2H.

Figure 3A:
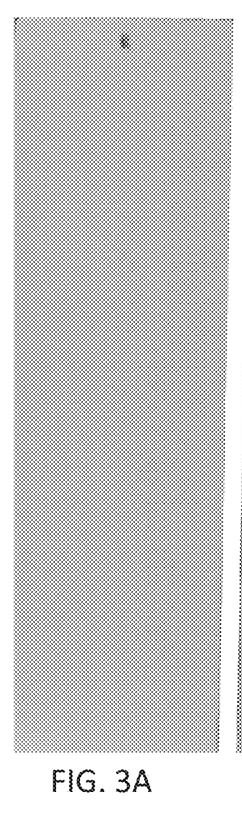
FIGS. 3A-3D are photographs of samples coated in primers according to embodiments of the present disclosure after spray application, wherein the sample of FIG. 3A is coated in the urethane primer of FIGS. 2A and 2B, the sample of FIG. 3B is coated in the acrylic urethane primer of FIGS. 2G and 2H, the sample of FIG. 3C is coated in the VE/UPR primer of FIGS. 2E and 2F, and the sample of FIG. 3D is coated in the UPR/VE primer of FIGS. 2C and 2D.
Figure 3B:
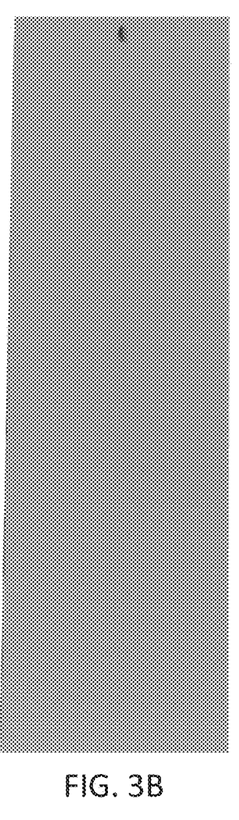
Figure 3C:
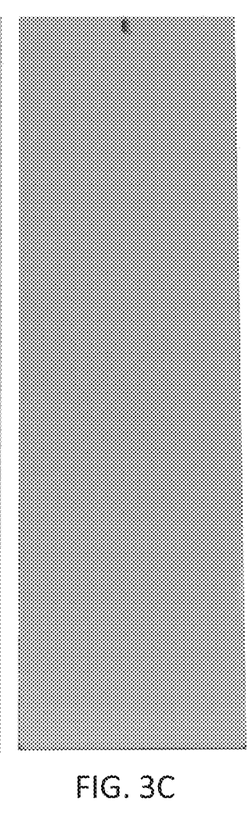
Figure 3D:
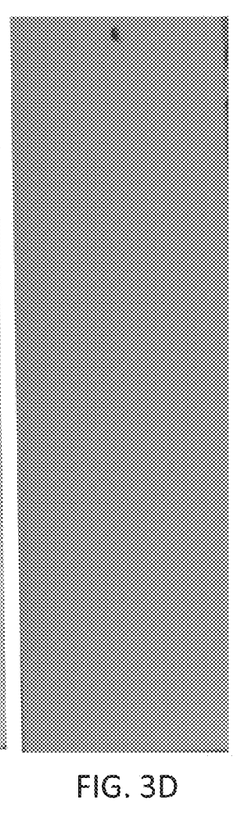

FIGS. 3A-3D are photographs of samples after spray applications of the inventive primer formulations prepared in Example 2, wherein the sample of FIG. 3A is coated in the urethane primer of FIGS. 2A and 2B, the sample of FIG. 3B is coated in the acrylic urethane primer of FIGS. 2G and 2H, the sample of FIG. 3C is coated in the VE/UPR primer of FIGS. 2E and 2F, and the sample of FIG. 3D is coated in the UPR/VE primer of FIGS. 2C and 2D.

Example 4—Testing the Guide Coat Contrast

The samples of Example 3 were sanded. In each of FIGS. 2A-2I the top half of the samples show the primer after spraying application and the bottom half of the samples show the primer after partial sanding. The samples of FIGS. 2C and 2D, on which an inventive formulation of Red Dye FR-1 at 0.5% and UPR/VE (Slick Sand) is applied, and the samples of FIGS. 2E and 2F, on which an inventive formulation of Red Dye FR-1 at 0.5% and VE/UPR (Super Build) is applied show well defined guide coats. That is the underlying cured primer is a gray color, while the guide coat at the surface of the primer is a pink/purple color. This high contrast results in an easy to see guide coat. The samples of FIGS. 2A and 2B, on which an inventive formulation of Red Dye FR-1 at 0.5% and urethane is applied, and the samples of FIGS. 2G and 2H, on which an inventive formulation of Red Dye FR-1 at 0.5% and Acrylic Urethane, is applied show less defined guide coats.

Example 5—Compounding of Inventive Formulations with Different Dyes

Figure 4A:
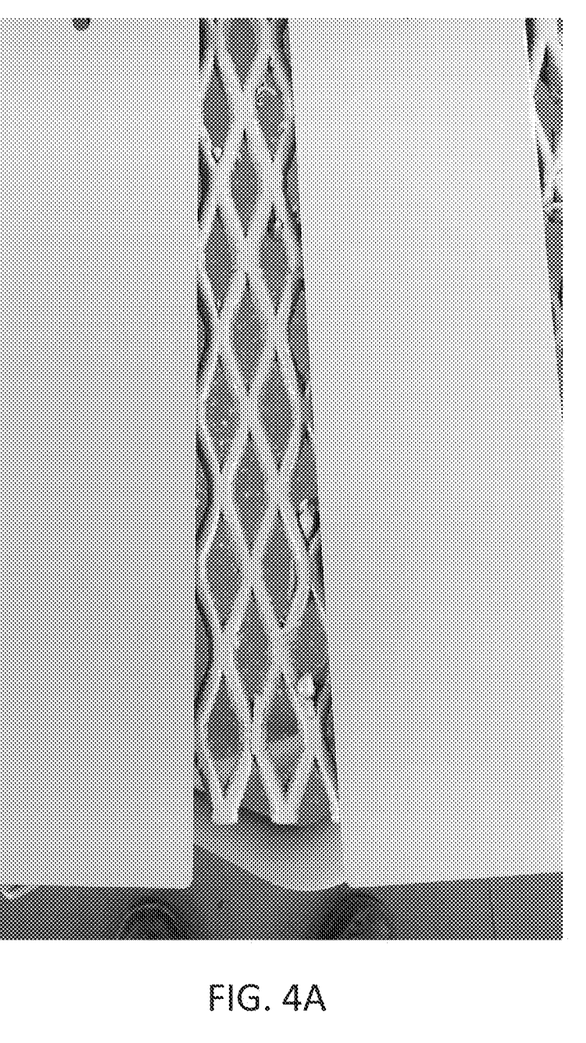
FIG. 4A is a photograph of samples after being sprayed with a Vinyl Ester/Unsaturated Polyester Resin Mixture (Super Build) and 0.5 weight % Methylene Blue primer according to an embodiment of the present disclosure.
Figure 4B:
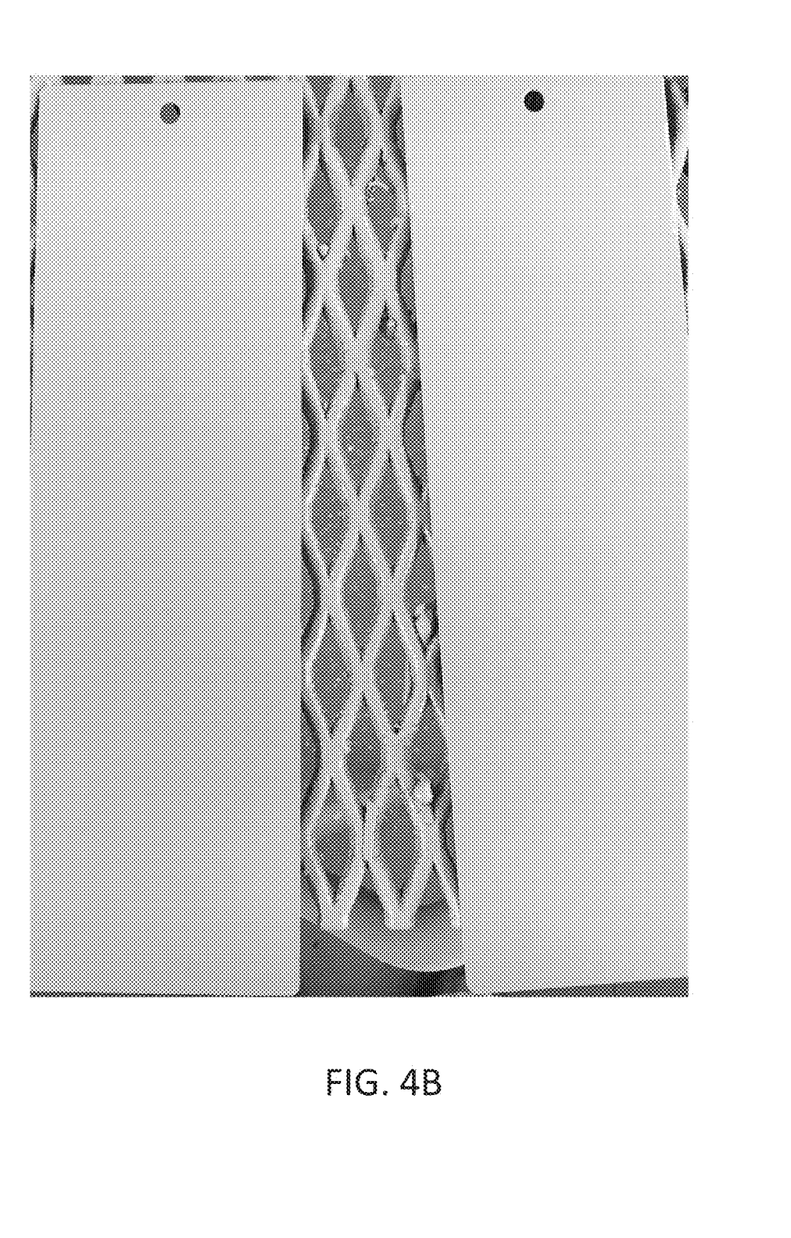
FIG. 4B is a photograph of samples after being sprayed with a Vinyl Ester/Unsaturated Polyester Resin Mixture (Super Build) and Oil Blue A dyes (3% active ingredient in solvent) primer according to an embodiment of the present disclosure.

The process and general formulation of Example 1 is repeated with Vinyl Ester/Unsaturated resin and Methylene Blue and Oil Blue A dyes. Samples are prepared as shown in FIGS. 4A-4B. The primer formulation on the samples of FIG. 4A include a Vinyl Ester/Unsaturated Polyester Resin Mixture (Super Build) and 0.5 weight % Methylene Blue solution (3% active ingredient in methanol), while the sample of FIG. 4B include a Vinyl Ester/Unsaturated Polyester Resin Mixture (Super Build) and 0.5 weight % Oil Blue A dye solution (3% active ingredient in solvent) primer.

Example 6—Effect of Cure Temperature and Testing the Guide Coat Contrast of Samples of Example 5

Figures 5A, 5B:
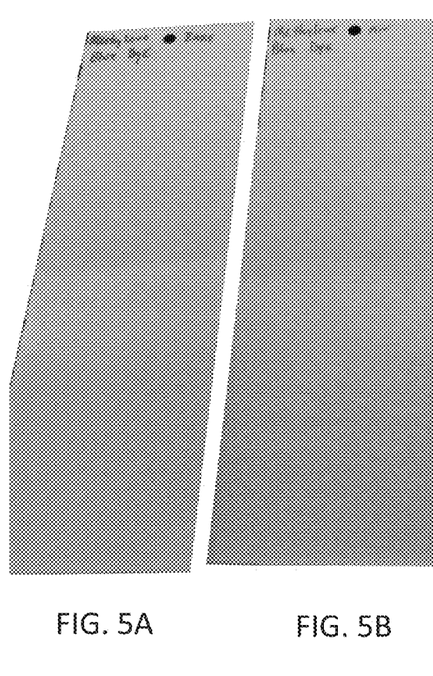
FIGS. 5A and 5B are photographs of samples coated in the primer of FIG. 4A, with the sample of FIG. 5A being baked and the sample of FIG. 5B being air dried, wherein the top half of the samples show the primer after spraying application and the bottom half of the samples show the primer after partial sanding.
Figures 5C, 5D:
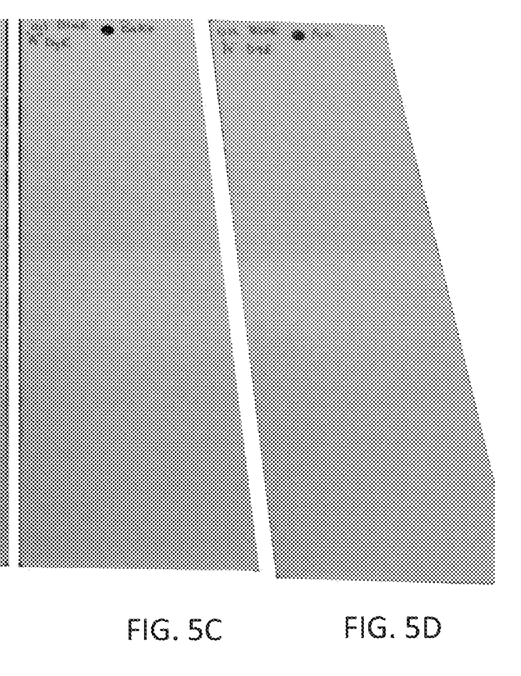
FIGS. 5C and 5D are photographs of samples coated in the primer of FIG. 4B, with the sample of FIG. 5C being baked and the sample of FIG. 5D being air dried, wherein the top half of the samples show the primer after spraying application and the bottom half of the samples show the primer after partial sanding.

The samples of Example 5 were cured at various conditions. FIGS. 5A and 5B are photographs of samples coated in the primer of FIG. 4A, with the sample of FIG. 5A being baked at 145 degrees F. for 45 minutes and the sample of FIG. 5B being air dried to cure. FIGS. 5C and 5D are photographs of samples coated in the primer of FIG. 4B, with the sample of FIG. 5C being baked at 145 degrees F. for 45 minutes and the sample of FIG. 5D being air dried.

The samples shown in FIGS. 5A-5D, the top half of the samples show the primer after spraying application and curing and the bottom half of the samples show the primer after partial sanding. The samples shown in FIGS. 5A and 5B that are coated in the primer formulation of FIG. 4A cured to a light green/blue color, while the samples shown in FIGS. 5C and 5D that are coated in the primer formulation of FIG. 4B cured to a light peach color. It is noted that the formulation of FIG. 4A (the Methylene Blue containing formulation) showed very little reaction, while the formulation of FIG. 4B (the Oil Blue A containing formulation) showed too fast of a reaction during both room temperature curing and baking.

After partial sanding of the samples in FIGS. 5A-5D, it is noted that the formulations of FIGS. 4A and 4B provide poor guide coats given that the color contrast between the cured primer and the guide coat at the surface of the primer is low.

Example 7—Applied Ultrahigh-Build Polyester Primer Surfacer

Figure 6A:
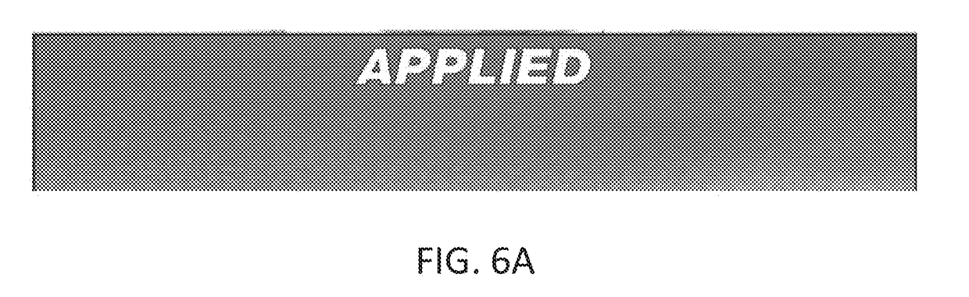
FIGS. 6A and 6B are photographs of a substrate coated with an embodiment of an ultrahigh-build polyester primer surfacer, where the primer surfacer is allowed to cure in FIG. 6A, and the primer is subsequently sanded to reveal low spots (dark color) and high spots (light color) as shown in FIG. 6B.
Figure 6B:
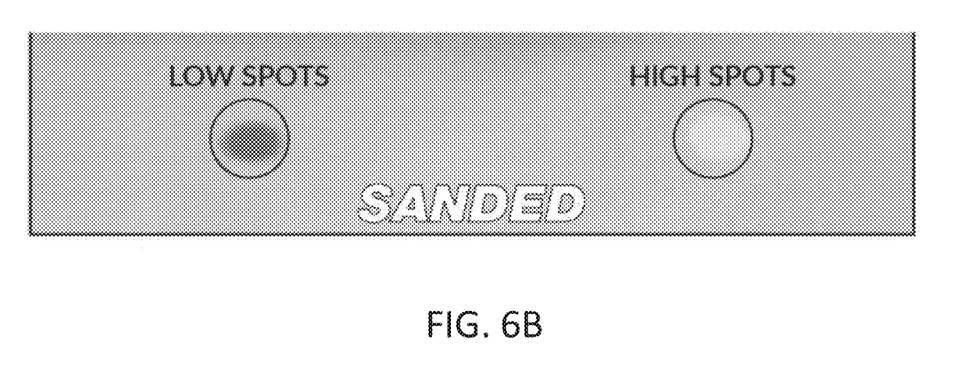

An Optex® Super Build 4:1 by Evercoat® that is a product of the assignee is applied to a substrate and allowed to cure as shown in FIG. 6A. The primer is subsequently sanded to reveal low spots (dark color) and high spots (light color).

As a person skilled in the art will recognize from the previous detailed description and from the figures and claims, modifications and changes can be made to the preferred embodiments of the invention without departing from the scope of this invention defined in the following claims.

The invention claimed is:

1. A process for priming a vehicle body comprising:
mixing a polyester resin formulation part A comprising: a curable resin having a degree of unsaturation, a monomer reactive diluent in which said curable resin is dissolved or suspended, and at least one color changing dye added as a solution, the at least one color changing dye adapted to change color upon mixing of said part A and a part B, a terminal color change occurring within ±5 minutes of cure of said curable resin and adapted to react with ambient air or light or a combination thereof to form a guide coat; with said part B being a storage-separate free-radical cure initiator package comprising a free-radical cure initiator to form a mixture;
applying said mixture to a substrate of the vehicle body in need of priming;
curing said mixture on said substrate under conditions adapted to cause said at least one color changing dye within to change to the terminal color within ±5 minutes of cure of said curable resin to a cured condition suitable for overcoating and to cause said at least one color changing dye at an exposed surface of the applied mixture to react with ambient air or light or a combination thereof to form the terminal color of said guide coat and having an internal color based on a lack of oxygen that is different from the terminal color; and
confirming that no low spots remain in said cured mixture by sanding said cured mixture until no guide coat color remains visible to an unaided, normal human eye.

2. The process of claim 1 wherein said curing occurs within 20 minutes of forming said mixture.

3. The process of claim 1 further comprising sanding said cured mixture.

4. The process of claim 3 wherein a time for sanding is determined based on a color of said dye that has a reactive color dependent on oxygen exposure.

5. The process of claim 1 wherein said terminal color and said internal color of said guide coat color are in contrast.

6. The process of claim 1 where the terminal color change of said at least one color changing dye is observed with an unaided normal human eye, or software operating on a computations device and analyzing a color photograph of said fill.

* * * * *